United States Patent [19]

Hashimoto et al.

[11] Patent Number: 5,145,134
[45] Date of Patent: Sep. 8, 1992

[54] TILTABLE-TURNTABLE FOR DISPLAY MONITOR

[75] Inventors: Kimio Hashimoto; Katsuyuki Ikoma, both of Fujisawa; Koji Tsushima, Ayase, all of Japan

[73] Assignee: Matsushita Electric Industrial Co., Ltd., Osaka, Japan

[21] Appl. No.: 714,039

[22] Filed: Jun. 12, 1991

[30] Foreign Application Priority Data

Jun. 14, 1990 [JP] Japan .................................. 2-156014

[51] Int. Cl.$^5$ ............................................. F16M 11/12
[52] U.S. Cl. ..................................... 248/183; 248/371; 248/923; 403/61
[58] Field of Search ............... 248/183, 178, 173, 371, 248/179, 181, 184, 185, 186, 187, 133, 349, 919, 920, 921, 922, 923; 403/53, 61, 69

[56] References Cited

U.S. PATENT DOCUMENTS

| | | | |
|---|---|---|---|
| 4,562,988 | 1/1986 | Bumgardner | 248/183 X |
| 4,570,892 | 2/1986 | Czech et al. | 248/183 X |
| 4,645,153 | 2/1987 | Granzow et al. | 248/178 |
| 4,880,191 | 11/1989 | Lake, Jr. | 248/371 |
| 5,037,050 | 8/1991 | Lin et al. | 248/179 |

*Primary Examiner*—Ramon O. Ramirez
*Attorney, Agent, or Firm*—Pollock, VandeSande & Priddy

[57] ABSTRACT

A tiltable turntable for supporting a display monitor, for example, has a support base, a monitor base, and a post of a substantially H-shaped cross section by which the support base and the monitor base are resiliently coupled to each other for relative tilting and rotational movement. The support base has two spaced stoppers. To assemble the tiltable turntable, the support base and the monitor base are sandwiched by the post, and the support base is turned with respect to the monitor base until a retaining member of the post rides over an inclined surface of one of the stoppers. When the retaining member of the post is positioned between the stoppers, the post is retained between the stoppers against dislodgment from the support base and limits the range of relative rotational movement between the support base and the monitor base. The support base and the monitor base are resiliently held together by the retaining member of the post.

8 Claims, 5 Drawing Sheets

TILTABLE-TURNTABLE FOR DISPLAY MONITOR

BACKGROUND OF THE INVENTION

1. Field of the Invention

The present invention relates to a tiltable turntable for a display monitor such as a cathode-ray-tube display monitor or the like.

2. Description of the Prior Art

Recently, more and more large-size and portrait-type display monitors are finding use as video display devices. Generally, such display monitors are equipped with a tiltable turntable for tilting the screen through desired vertical angles and turning it in desired horizontal directions.

FIG. 10 of the accompanying drawings shows one conventional tiltable turntable for use with a display monitor. The tiltable turntable is mounted on a support base 1, and includes a turntable base 2 disposed on an upper surface of the support base 1. The turntable base 2 has a central sliding surface 2b on which a tiltable base 3 is mounted. The turntable base 2 is horizontally rotatably supported at its center on the support base 1. The tiltable base 3, which supports a display monitor (not shown), is tiltable on the central sliding surface 2b in sliding contact therewith.

The tiltable base, or monitor base, 3 is tiltable between two angularly spaced positions 3a, 3b indicated by two-dot-and-dash lines. The monitor base 3 has an upper sliding surface 3c and a lower sliding surface 3d which is slidably held against the central sliding surface 2b. A T-shaped post 4 is mounted on the center of the support base 1 and extends through and is supported by a central support 2a of the turntable base 2. The T-shaped post 4 has a sliding surface 4a on its upper end which is held in sliding contact with the upper sliding surface 3c of the monitor base 3. The T-shaped post 4 has a central hole 4b defined vertically therethrough.

To assemble the tiltable turntable, the support base 1, the turntable base 2, and the monitor base 3 are placed in a superimposed relationship, then a compression coil spring 5 and the post 4 are inserted in the central support 2a of the turntable base 2, and finally a screw 7 is threaded into the hole 4b with a washer 6 held against the spring 5.

The conventional tiltable turntable shown in FIG. 10 operates as follows: The support base 1 is placed on a desk, for example, and the turntable base 2 is horizontally rotatable about the central axis of the support base 1 so that the display monitor on the monitor base 3 can freely rotate about a vertical axis.

The motor base 3 is also tiltable between the positions 3a, 3b through sliding contact between the sliding surface 3d and the sliding surface 2b. Therefore, the display monitor on the monitor base 3 can freely rotate also in the vertical direction. The post 4 is positioned centrally in the tiltable turntable, and the turntable base 2 and the monitor base 3 are held together by the sliding surface 4a and the spring 5 that is retained by the washer which is fastened to the post 4 by the screw 7. Therefore, the sliding surface 3d and the sliding surface 2b, and also the sliding surface 3c and the sliding surface 4a are held in sliding contact with each other under resilient forces.

With the structure of the conventional tiltable turntable, however, since the compression coil spring 5 for holding the post 4 and the monitor base 3 has to be retained in place by the washer 6 and the screw 7, the tiltable turntable cannot easily be assembled. In addition, the conventional turntable is made up of a large number of components.

SUMMARY OF THE INVENTION

In view of the aforesaid drawbacks of the conventional tiltable turntable, it is an object of the present invention to provide a tiltable turntable for display monitors which is simple in structure, can be assembled with ease, and allows smooth sliding movement between components.

According to the present invention, there is provided a tiltable turntable for a display monitor, comprising a support base, a monitor base for supporting the display monitor thereon, and a post of a substantially H-shaped cross section, the support base and the monitor base being coupled together by the post for relative tilting and rotational movement. The monitor base has an oblong hole defined therein, the post being inserted in the oblong hole for limiting relative tilting movement between the support base and the monitor base. The support base has a first stopper and a second stopper which are angularly spaced from each other and engageable by the post for limiting relative rotational movement between the support base and the monitor base.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
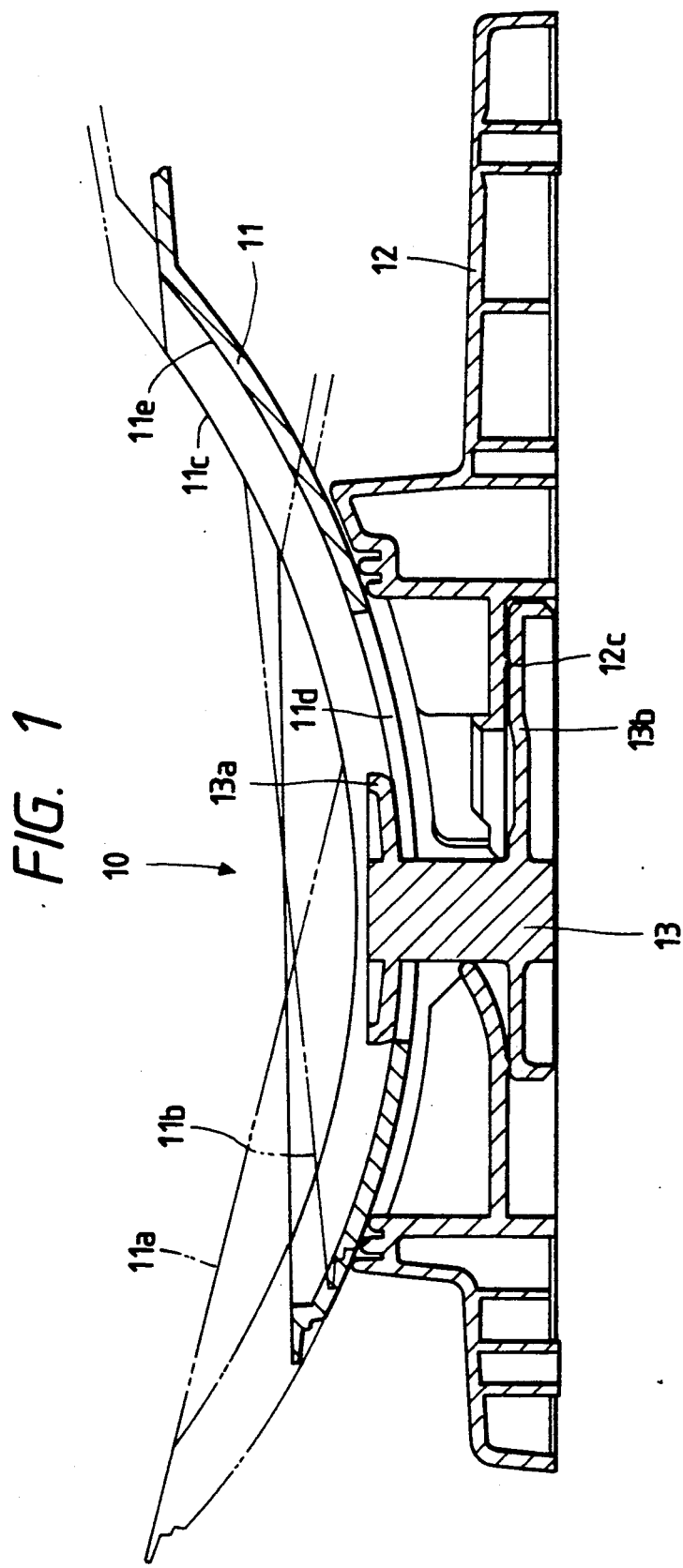
FIG. 1 is a vertical cross-sectional view of a tiltable turntable according to the present invention.

As shown in FIG. 1, a tiltable turntable 10 according to the present invention comprises a support base 12, a tiltable base or monitor base 11 mounted on the support base 12, and a post 13 retaining the monitor base 11 in position on the support base 12, the post 13 being substantially H-shaped in cross section. The monitor base 11 is tiltable between two angularly spaced positions 11a, 11b indicated by two-dot-and-dash lines.

Figure 2:
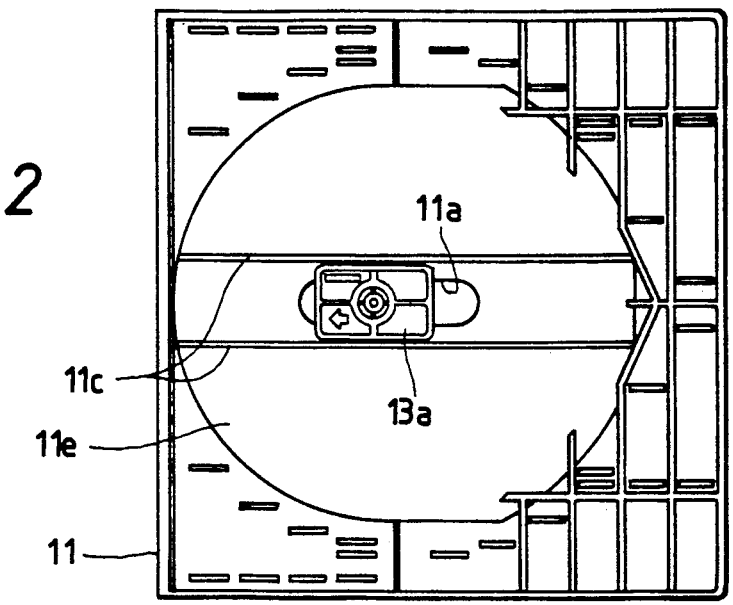
FIGS. 2, 3 and 4 are plan, vertical cross-sectional, and bottom views showing the manner in which the tiltable turntable according to the present invention is assembled.
Figure 3:
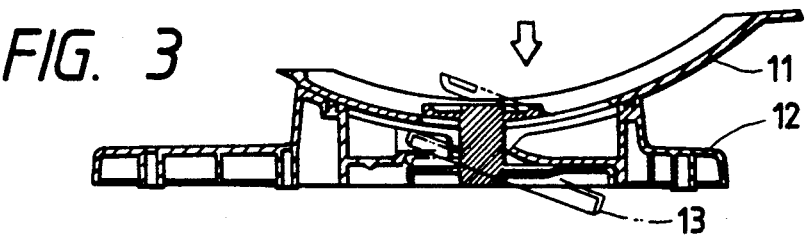
Figure 4:
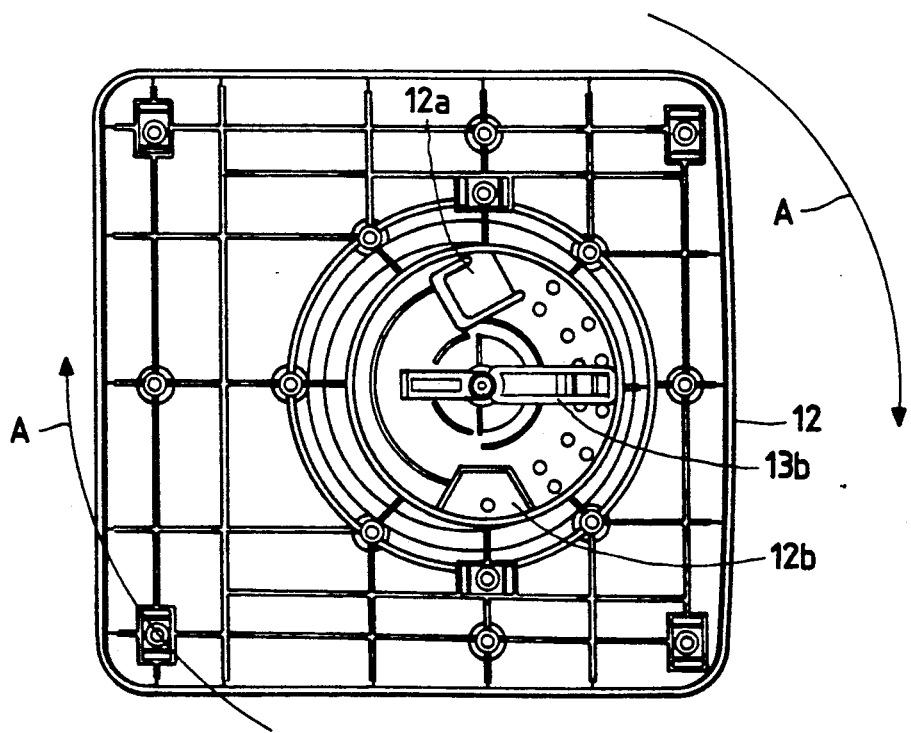

As shown in FIG. 2, the monitor base 11 has a partly spherical portion 11e with two parallel ribs 11c extending thereacross. The partly spherical portion 11e has an oblong hole 11d defined therein and positioned between the ribs 11c. To put the monitor base 11 and the support base 12 together, the post 13 is inserted downwardly into the oblong hole 11d while being angularly displaced, as shown in FIG. 3, until an upper retaining member 13a of the post 13 is placed on the partly spherical potion 11e between the ribs 11c and a lower retaining member 13b of the post 13 is held against a bottom surface of the support base 12, as shown in FIG. 4. The upper and lower retaining members 13a, 13b now resiliently sandwich the monitor base 11 and the support base 12.

The oblong hole 11d through which the post 13 is inserted extends parallel to the ribs 11c. When the monitor base 11 is in the position 11a, the post 13 is engaged by one end of the oblong hole 11d, and when the monitor base 11 is in the position 11b, the post 13 is engaged by the other end of the oblong hole 11d. Stated otherwise, the oblong hole 11d defines an angular range in which the monitor base 11 is tiltable with respect to the support base 12.

Figure 5:
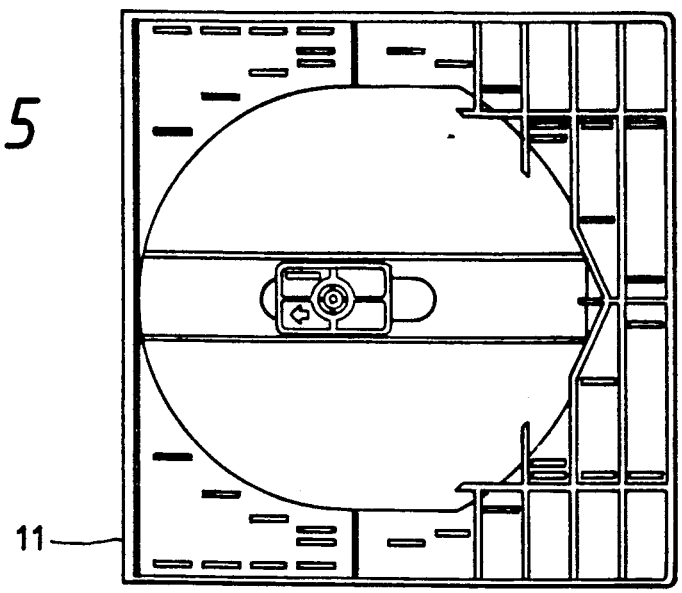
FIGS. 5, 6, and 7 are plan, vertical cross-sectional, and bottom views showing the manner in which the tiltable turntable according to the present invention operates.
Figure 6:
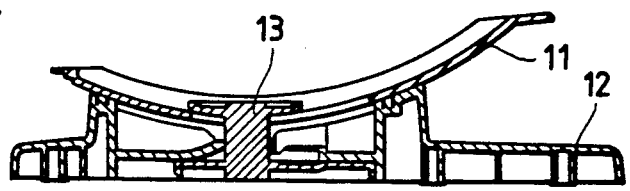
Figure 7:
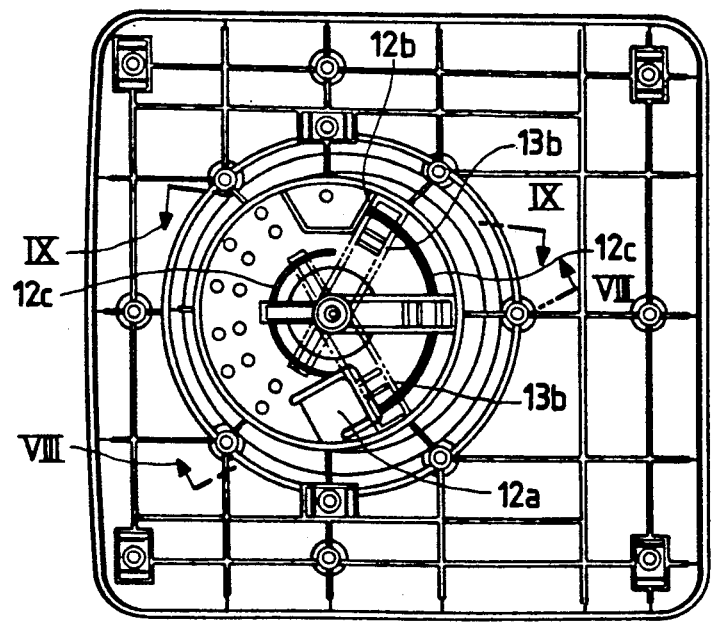

Then, the support base 12 is turned 180° with respect to the monitor base 11 and the post 13 in the direction indicated by the arrows A from the position shown in FIG. 4 to the position shown in FIGS. 5, 6, and 7.

Figure 8:
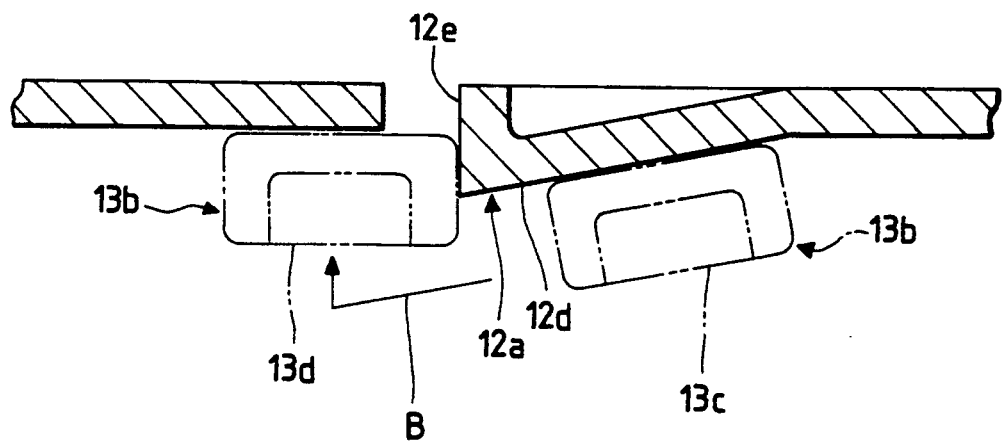
FIG. 8 is an enlarged fragmentary cross-sectional view taken along line VIII—VIII of FIG. 7.
Figure 9:
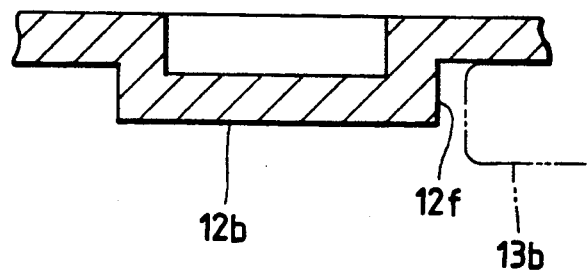
FIG. 9 is an enlarged fragmentary cross-sectional view taken along line IX—IX of FIG. 7.
Figure 10:
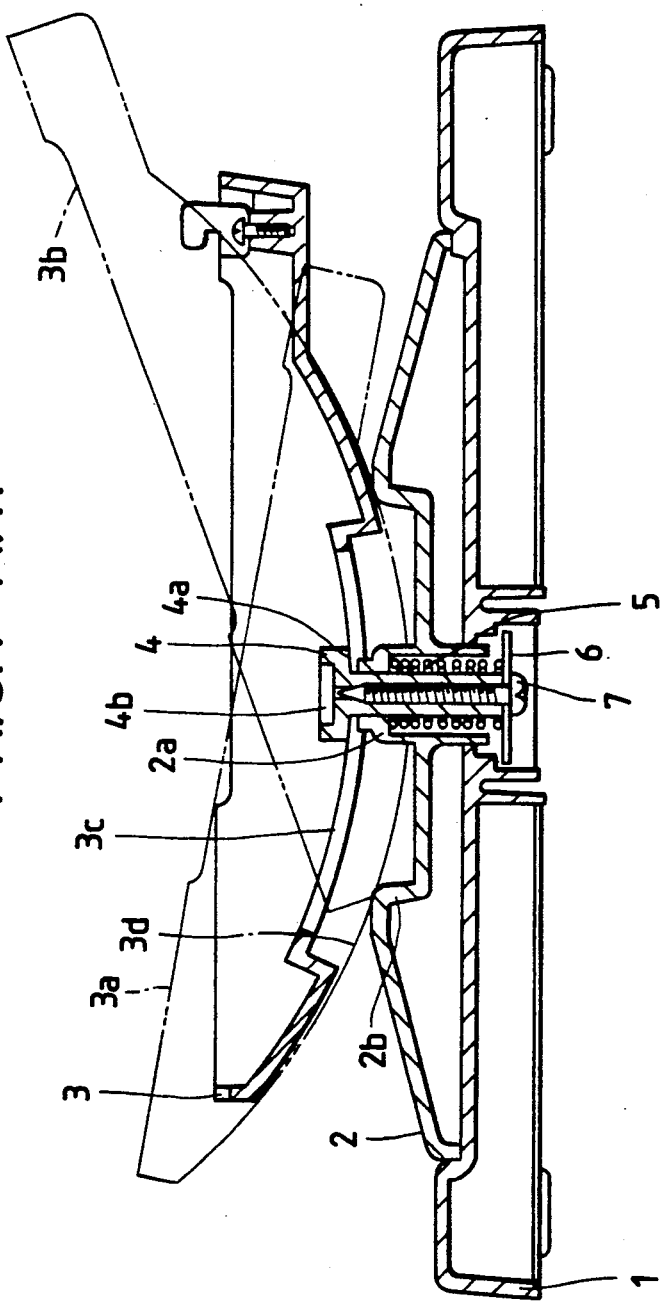
FIG. 10 is a vertical cross-sectional view of a conventional tiltable turntable.

On the rotation of the support base 12 through 180°, the lower retaining member 13b of the post 13 rides over and goes beyond a first stopper 12a on the bottom surface of the support base 12. More specifically, as shown in FIG. 8, the lower retaining member 13b goes from the position indicated by the two-dot-and-dash lines 13c, rides over the first stopper 12a, and reaches the position indicated by the two-dot-and-dash lines 13d beyond the first stopper 12a, as indicated by the arrow B. The first stopper 12a has an inclined surface 12d which allows the lower retaining member 13b to ride thereon, the inclined surface 12d terminating in a vertical wall 12e. The vertical wall 12e prevents the lower retaining member 13b from moving back onto the first stopper 12a. Therefore, once the lower retaining member 13b has moved past the first stopper 12a, it cannot return over the first stopper 12a. The bottom surface of the support base 12 also has a second stopper 12b which is positioned in substantially diametrically opposite relationship to the first stopper 12a. As shown in FIG. 9, the second stopper 12b has a vertical wall 12f which prevents the lower retaining member 13b from moving past the second stopper 12b. Therefore, the first and second stoppers 12a, 12b serve to prevent the lower retaining member 13b from moving beyond the angular range which is defined between the first and second stoppers 12a, 12b. Accordingly, the lower retaining member 13b, and hence the post 13 and the monitor base 11, are angularly movable with respect to the support base 12 within the angular range between the first and second stoppers 12a, 12b (FIG. 7).

The monitor base 11 and the support base 12 are held together under the resiliency of the lower retaining member 13b which projects laterally from the body of the post 13. The lower retaining member 13b is slidingly held against an arcuate rib 12c on the bottom surface of the support base 12. The height of the rib 12c may be varied to adjust the resiliency of the lower retaining member 13b for thereby holding the monitor base 11 and the support base 12 together under desired pressure.

Since the tiltable turntable according to the present invention has no screw and no washer, it is simple in structure, i.e., made up of a reduced number of components, and can easily be assembled. The tiltable turntable does not have any compression coil spring either, but can hold the monitor base 11 and the support base 12 resiliently together under adjustable pressure.

Although a certain preferred embodiment has been shown and described, it should be understood that many changes and modifications may be made therein without departing from the scope of the appended claims.

What is claimed is:

1. A tiltable turntable for a display monitor, comprising:
    a support base;
    a monitor base for supporting the display monitor thereon;
    a post of a substantially H-shaped cross section, said support base and said monitor base being coupled together by said post for relative tilting and rotational movement;
    said monitor base having an oblong hole defined therein, said post being inserted in said oblong hole for limiting relative tilting movement between said support base and said monitor base; and
    said support base having a first stopper and a second stopper which are angularly spaced from each other and engageable by said post for limiting relative rotational movement between said support base and said monitor base;
    wherein said post has a first retaining member and a second retaining member which are spaced from each other, said first retaining member being held against said monitor base, said second retaining member being held against said support base.

2. A tiltable turntable according to claim 1, wherein said support base has a rib extending in a direction in which said support base and said monitor base rotate relatively to each other, said second retaining member resiliently engaging said rib.

3. A tiltable turntable according to claim 1, wherein said first and second stoppers have respective walls for engaging said post to prevent the post from moving beyond said first and second stoppers.

4. A tiltable turntable according to claim 3, wherein one of said first and second stoppers has an inclined surface for allowing said post to be positioned between said first and second stoppers when said support base, said monitor base, and said post are assembled.

5. A tiltable turntable for a display monitor, comprising:
    a support base;
    a partly spherical monitor base for supporting the display monitor thereon;
    a post of a substantially H-shaped cross section, said support base and said monitor base being resiliently coupled together by said post for relative tilting and rotational movement;
    said monitor base having an oblong hole defined therein, said post being inserted in said oblong hole for limiting relative tilting movement between said support base and said monitor base; and
    said support base having a first stopper and a second stopper which are angularly spaced from each other and engageable by said post for limiting relative rotational movement between said support base and said monitor base and retaining said post against dislodgment from said mount base;
    wherein said post has a first retaining member and a second retaining member which are spaced from each other, said first retaining member being held against said monitor base, said second retaining member being held against said support base.

6. A tiltable turntable according to claim 5, wherein said support base has a rib extending in a direction in which said support base and said monitor base rotate relatively to each other, said second retaining member resiliently engaging said rib.

7. A tiltable turntable according to claim 5, wherein said first and second stoppers have respective walls for engaging said post to prevent the post from moving beyond said first and second stoppers.

8. A tiltable turntable according to claim 7, wherein one of said first and second stoppers has an inclined surface for allowing said post to be positioned between said first and second stoppers when said support base, said monitor base, and said post are assembled.

* * * * *